(12) United States Patent
Liao et al.

(10) Patent No.: US 12,545,774 B2
(45) Date of Patent: Feb. 10, 2026

(54) RESPONSE SURFACE METHOD OPTIMIZED MODIFIED CHITOSAN-LZM-CA COMPOSITE ANTIBACTERIAL PRESERVATIVE FILM AND PREPARATION METHOD AND APPLICATION THEREOF

(71) Applicants: Institute of Agro-Products Processing and Nuclear Agricultural Technology, Hubei Academy of Agricultural, Hubei (CN); Guangzhou Furui Gaoneng Technology Co., Ltd., Guangdong (CN)

(72) Inventors: Tao Liao, Hubei (CN); Liang Qiu, Hubei (CN); Qinghua Luo, Hubei (CN); Guangquan Xiong, Hubei (CN); Chan Bai, Hubei (CN); Juguang Wang, Hubei (CN); Xiaoyan Zu, Hubei (CN); Hailan Li, Hubei (CN); Jun Wang, Hubei (CN); Hui Ma, Hubei (CN)

( * ) Notice: Subject to any disclaimer, the term of this patent is extended or adjusted under 35 U.S.C. 154(b) by 594 days.

(21) Appl. No.: 17/982,479

(22) Filed: Nov. 7, 2022

(65) Prior Publication Data

US 2023/0142325 A1   May 11, 2023

(30) Foreign Application Priority Data

Nov. 9, 2021   (CN) .......................... 202111322226.X (51) Int. Cl.
| | |
|---|---|
| *C08L 5/08* | (2006.01) |
| *B65D 65/00* | (2006.01) |
| *C08J 5/18* | (2006.01) |
| *C08L 5/00* | (2006.01) |
| *C08L 89/00* | (2006.01) |
| *G16C 60/00* | (2019.01) |
| *G16C 20/30* | (2019.01) |

(52) U.S. Cl.
CPC ................ *C08L 5/08* (2013.01); *B65D 65/00* (2013.01); *C08J 5/18* (2013.01); *C08L 5/00* (2013.01); *C08L 89/00* (2013.01); *G16C 60/00* (2019.02); *C08J 2305/00* (2013.01); *C08J 2305/08* (2013.01); *C08L 2203/162* (2013.01); *G16C 20/30* (2019.02)

(58) Field of Classification Search
CPC ........ C08L 5/08; C08L 5/00; C08L 2203/162; C08J 5/18; C08J 2305/00; C08J 2305/08; G16C 20/30; G16C 60/00; B65D 65/00
USPC .......................................................... 523/100
See application file for complete search history.

(56) References Cited

U.S. PATENT DOCUMENTS

| | | | | |
|---|---|---|---|---|
| 2007/0104836 | A1* | 5/2007 | Zhao | ....................... B32B 9/045 426/61 |
| 2009/0298792 | A1* | 12/2009 | Grassauer | ............ A61K 31/722 514/57 |

\* cited by examiner

*Primary Examiner* — Ruiyun Zhang (57) ABSTRACT

The invention discloses a modified chitosan-LZM-CA composite antibacterial cling film optimized by response surface methodology and the preparation method and application thereof, relates to the technical field of food packaging materials. The invention provides freshwater crayfish as the research object, and adopts the modified chitosan, lysozyme (LZM), a good film-forming material carrageenan (CA) as the composite antibacterial cling film materials, and through the response surface experimental design to determine the best ratio of modified chitosan-LZM-CA composite antibacterial cling film. Furthermore, the TVB-N value and the change value of the total number of bacterial colonies of the freshwater crayfish with the composite antibacterial cling film during refrigeration, can be regarded as indicators to examine the preservation effect, providing a theoretical basis of the chitosan composite film preservation technology development and application for freshwater crayfish and other aquatic products.

4 Claims, 7 Drawing Sheets

RESPONSE SURFACE METHOD OPTIMIZED MODIFIED CHITOSAN-LZM-CA COMPOSITE ANTIBACTERIAL PRESERVATIVE FILM AND PREPARATION METHOD AND APPLICATION THEREOF

1. TECHNICAL FIELD

The invention belongs to the technical field of food packaging materials, and in particular to a food cling film, and more specifically, the invention relates to a modified chitosan-LZM-CA composite antibacterial cling film optimized by response surface methodology and the preparation method and application thereof.

2. BACKGROUND ART

Currently, food cling films are widely used in the food field and are in the preliminary stage of development. For instance, Zhang Han et al. (2019) has reported a study on *Trachinotus ovatus* using a comprehensive packaging method of polylysine composite film with vacuum packaging, with the results that such cling film could significantly improve the freshness of chilled meat products.

Chitosan is the only positively charged polymeric substance among natural polysaccharides, with the properties of good stability, hygroscopicity, bio-functionality, and antibacterial activity. In addition to antibacterial activity, chitosan also has film-forming properties, which can be regarded as a polymer compound with good film-forming property, and the formed film has certain mechanical strength. Several studies have confirmed that chitosan-based cling film has good preservation effect on aquatic products, which can solve the problems of being perishable and short shelf life. Although chitosan shows good preservation performance, there are still some problems in practical industrial applications: poor antibacterial broad spectrum and relatively weak mechanical strength, which require to be further improved for the preservation effect of chitosan.

Currently, there are various methods regarding shrimp meat preservation, comprising the physical preservation, chemical preservation, and biological preservation. The common problem with these existing techniques is the low sensory evaluation of chilled meat and the non-ideal antibacterial effect. Therefore, the development of edible materials to make food-grade cling films for aquatic products preservation has a broad market and development prospects.

Based on the above reasons and objects, the invention application is filing to provide a modified chitosan-LZM-CA composite antibacterial cling film optimized by response surface methodology and the preparation method and application thereof.

3. SUMMARY OF THE INVENTION

Carrageenan (CA) consists mainly of large molecules of dietary fibers. It has been widely used as film-forming materials and edible film substrates due to its good film-forming, renewable and biocompatible properties. Carrageenan can be used to increase the viscosity of food products and to increase the plasticity and ductility of films. Furthermore, It can be used to increase the ductility in the production of cling coated films.

Lysozyme (LZM) has a broad antimicrobial spectrum and high safety as a preservative, which is also has an inhibitory effect on some G­ bacteria without the limitation to G+ bacteria, and can play a bactericidal role through the structure by recognizing microbial related structures. Lysozyme is a natural protein and has been approved as a safe additive for application in food by the FAO/WTO Food Additives Association in 1992.

In view of this, the object of the invention is to provide a modified chitosan-LZM-CA composite antibacterial cling film optimized by response surface methodology and the preparation method and application thereof, especially in food preservation including fresh meat, freshwater crayfish and so on, to solve or at least partially solve the above-mentioned technical deficiencies in the prior art.

In order to achieve the above first purpose of the invention, the invention provides a novel material: modified chitosan-LZM-CA composite antibacterial cling film, which is obtained by uniformly coating the composite film coating solution on the surface of the clean base material and being dried at a constant temperature.

Another purpose of the invention is to provide the preparation method of the modified chitosan-LZM-CA composite antibacterial cling film, the core of which is to optimize the combination of the dosage and ratio of the 3 edible materials using the response surface methodology.

A further purpose of the present invention is to provide the application of the modified chitosan-LZM-CA composite antibacterial cling film, which can be used for preserving food including fresh meat, crayfish and so on.

To achieve the first object, the invention provides the following technical solutions:

A modified chitosan-LZM-CA composite antibacterial cling film, wherein the cling film is obtained by uniformly coating the composite film coating solution on the surface of the clean base material and being dried at a constant temperature; wherein the composite film coating solution is composed of modified chitosan, carrageenan, lysozyme and solvent.

Specifically, in the above technical solution, it is necessary requirement to observe the state of the film from time to time to prevent breakage during the drying process, and the film should be taken out in time and placed in the room to dry naturally after the breakage is found. Preferably, the temperature of the constant temperature drying process is 40-45° C. and drying time is 8 h.

Further, in the above technical solution, each L of composite film coating solution contains the range of 14-18 g of modified chitosan, 1.5-2.5 g of carrageenan and 1-2 g of lysozyme.

Preferably, in the above technical solution, each L of composite film coating solution contains 16 g of modified chitosan, 2 g of carrageenan and 1.5 g of lysozyme.

Further, in the above technical solution, the solvent is an acetic acid solution and the volume percentage of acetic acid in the solution is preferably 0.05-2%.

Further, in the above technical solution, the modified chitosan is prepared by the following method:

degrading the chitosan by irradiation with a dose of 20-100 KGy to obtain the modified chitosan.

Preferably, in the above technical solution, the irradiation dose is 80 KGy or 100 KGy. And more preferably is 100 KGy.

The above modified chitosan prepared by irradiation method has good antibacterial ability, especially the molecular weight of chitosan after irradiation by 80 KGy or 100 KGy dose is less changed and tends to be stable, with the better antibacterial effect.

Further, in the above technical solutions, the thickness of the cling film is unlimited and can be adjusted according to actual needs. For instance, the thickness of the cling film can be 0.1-1.0 mm.

To achieve the second object, the invention provides the following technical solutions:

The preparation method of the modified chitosan-LZM-CA composite antibacterial cling film optimized by response surface methodology according to any one of claims 1-4, wherein comprises the following steps:

(1) Screening the central level of the main effect factor: the concentration of modified chitosan, the concentration of lysozyme, and the concentration of carrageenan in the composite film coating solution for the preparation of modified chitosan-LZM-CA composite antibacterial cling film are used as variables in a single-factor experiment for screening the central level of total volatile basic nitrogen value (TVB-N value) of crayfish during refrigeration.

(2) Response surface optimization: according to the experimental design principle of Box-Behnken central group, and according to the single-factor experiment results in step (1), three better levels of the three factors including the concentration of modified chitosan, the concentration of lysozyme and the concentration of carrageenan in the composite film coating solution, were selected as the influencing factors, and the TVB-N value of crayfish during refrigeration as the measurement index, and the experimental design was carried out by response surface analysis with the 3 factors and 3 levels on the basis of single-factor experiment.

(3) Performing variance analysis and linear fitting of the experimental results obtained from step (2) using the software Design-Expert to obtain variance analysis results and second-order polynomial regression models, to analyze the interactions among the factors and the relationships between the factors and the response values.

(4) Performing significance analysis on the second-order polynomial regression model to determine whether the regression equation is appropriate based on the p-value with lack of fit of the regression equation to test whether the lack of fit is significant; to determine whether the regression equation is significant based on the significance testing, and determine the predictive value of the model based on the simulated determination coefficient $R^2$, the modified determination coefficient $R^2_{Adj}$ of the model and the predictive determination coefficient $R^2_{Pred}$ of the model.

(5) Using the software Design-Expert to plot and analyze the relationship between the independent variables and response values based on the second-order polynomial regression model, to obtain the three-dimensional response surface plot of the regression equation; to analyze and optimize the second-order polynomial model and response surface through the Design-Expert software to determine the optimal concentration of each component in the composite film coating solution.

Further, in the above technical solution, the experimental method in step (1) comprises the following steps: weighing modified chitosan dissolved in acetic acid solution with a volume percentage of 1%, controlling the concentration of the modified chitosan; adding carrageenan after complete dissolution and controlling the concentration of said carrageenan; continuing to add lysozyme after uniform dispersion and controlling the concentration of the lysozyme; after complete dissolution, standing until the surface air bubbles are completely dissolved, to obtain composite film coating solution; taking 11-13 mL of the composite film coating solution and coating in a 90 mm diameter sterilized petri dish, to be placed in the oven at constant temperature drying, and to obtain modified chitosan-LZM-CA composite antibacterial cling film; then using the cling film to wrap freshwater crayfish after the process of steaming, draining and cooling, to put into bags vacuum packaging; using automatic Kjeldahl method to determine the TVB-N value of crayfish during refrigeration.

Specifically, in the above technical solutions, the carrageenan in the acetic acid solution of modified chitosan and composite film coating solution are granular state without complete dissolution; the film formation should be process timely after adding carrageenan to prevent solidification into a lump.

Further, in the above technical solutions, the level of each main effect factor in step (1) is as follows: in the range of 10-18 g/L of modified chitosan, 0.5-2.5 g/L of lysozyme and 1-3 g/L of carrageenan in the composite film coating solution.

Further, in the above technical solutions, the level of 3 preferred levels of the 3 factors in step (2) are as follows: in the range of 14-18 g/L of modified chitosan, 1-2 g/L of lysozyme and 1.5-2.5 g/L of carrageenan in the composite film coating solution.

Further, in the above technical solutions, the second order polynomial regression model equation in step (3) is as follows:

$$Y=272.74-193.1*A-635.19*B-351.85*C+24.55*A*B-6.91*A*C+313.22*B*C+57.28*A^2+1373.08*B^2+1013.25*C^2;$$

wherein A is the concentration of modified chitosan, B is the concentration of carrageenan, and C is the concentration of lysozyme.

Further, in the above technical solution, the formula of the optimized composite film coating solution in step (5) is as follows: the concentration of modified chitosan is 16 g/L, the concentration of lysozyme is 1.5 g/L, and the concentration of carrageenan is 2 g/L.

The third object of the invention is to provide the application of modified chitosan-LZM-CA composite antibacterial cling film in food preservation and food packaging, especially as a wrapping material in refrigerated or frozen fresh meat, crayfish and so on.

Compared to the prior arts, the invention has the following advantages and beneficial effects:

(1) The invention provides freshwater crayfish as the research object, and adopts the modified chitosan, lysozyme (LZM), a good film-forming material carrageenan (CA) as the composite antibacterial cling film materials, and through the response surface experimental design to determine the best ratio of modified chitosan-LZM-CA composite antibacterial cling film. Furthermore, the TVB-N value and the change value of the total number of bacterial colonies of the freshwater crayfish with the composite antibacterial cling film during refrigeration, can be regarded as indicators to examine the preservation effect, providing a theoretical basis of the chitosan composite film preservation technology development and application for freshwater crayfish and other aquatic products.

(2) The invention adopted chitosan to form the film after high degree of deacetylation and irradiation degradation, which solves the technical problem of pure chitosan film with large molecular weight, difficult to dissolve and poor freshness preservation ability. Further, the invention adds carrageenan to increase the ductility and plasticity of the preservation film, and with good antibacterial ability of lysozyme, which can play a good role in preserving freshness and increasing the shelf life of crayfish meat.

(3) The composite film coating solution used in the preparation of cling film provided by the invention is composed of three edible materials and solvents including modified chitosan, carrageenan and lysozyme, and with the certain synergistic effect generated by the three edible materials, which makes the cling film prepared by the invention have the advantages of good freshness preservation ability and strong antibacterial effect. Therefore, the cling film prepared by the invention can solve the problems of poor sensory evaluation, unsatisfactory antibacterial effect and non-ideal preservation effect of refrigerated or frozen food including fresh meat and crayfish in the prior art.

(4) The invention utilizes the synergistic effect between the three edible materials to reduce the amount of the three components, decreasing the production cost and conducive to large-scale industrial production.

5. SPECIFIC EMBODIMENT OF THE INVENTION

The invention will be described in further detail with reference to specific embodiments. The invention is implemented on the premise of the technology of the invention, and the detailed embodiment and the specific operation process will be given to illustrate the creativity of the invention, and the scope of the invention is not limited to the following embodiments.

According to the information contained in the invention application, various changes to the precise description of the invention can be easily made for those skilled in the art without deviating from the spirit and scope of the appended claims. It should be understood that the scope of the invention is not limited to the processes, properties or components as defined, since these embodiments and others are described only to illustrate schematically particular aspects of the invention. In fact, various changes to embodiments of the invention that are apparently capable of being made by those skilled in the art or related fields shall all fall within the protection scope of the invention.

In order to better understand the invention and not to limit the scope of the invention, all numbers, percentages, and other values used in this application to indicate dosage, should in all cases be understood as modified by the word 'approximately'. The individual numerical parameters should be considered to be at least as valid as those reported and obtained by conventional rounding methods. The testing methods used in the following embodiments are conventional methods unless otherwise specified, and the raw materials and reagents used are commercially available from conventional commercially available sources, such as the market, unless otherwise specified.

Embodiment 1

The invention adopts modified chitosan from irradiation degradation to form a film, and to improve the antibacterial ability through the change of the molecular weight of chitosan.

Weighing 5 portions of chitosan raw materials, each chitosan is 10 g, irradiated and degraded with 20 KGy, 40 KGy, 60 KGy, 80 KGy, 100 KGy respectively, i.e., irradiated with irradiation source of dose rate 6.25 Gy/min for 53.3 h, 106.67 h, 160 h, 213.3 h, 266.67 h, respectively, to get 5 kinds of modified chitosan treated with modified chitosan treated with different irradiation doses; wherein: said irradiation source is: 60 Co source, 380,000 curies, and the dose rate is 6.25 Gy/min.

Comparative Embodiment 1

The chitosan raw material used in this comparative embodiment is the same as in embodiment 1. In order to contrast with embodiment 1, this comparative embodiment does not treat the chitosan raw material with irradiation degradation.

The molecular weights of the modified chitosan obtained in embodiment 1 and the unmodified chitosan raw material in comparative embodiment 1 were determined separately in the invention and the determination methods are as follows:

S21. Calculation of the Degree of Deacetylation of Chitosan Raw Materials.

Precisely weighing 0.3 g of chitosan raw material to be measured, putting it into a constant temperature drying oven at 120° C. for 15 min to constant weight, and calculating the percentage of drying loss.

At room temperature, taking 0.5 g of chitosan with precise weighing, then adding 18 L of hydrochloric acid titrant (0.3 mol/L) precisely, putting the obtained mixture on a magnetic stirrer and adjusting the appropriate speed to stir magnetically for 2 hours to fully dissolve chitosan; then adding 3 drops of 1% methyl orange indicator with thoroughly shaking, and titrating it slowly with sodium hydroxide titrant (0.15 mol/L) until it turns orange. It is noted to pay attention to sufficient stirring and record the experimental data during the titration.

Calculating the degree of deacetylation of chitosan raw material by the following formula and the degree of deacetylation should be greater than 70%.

$$D.D.\% = \frac{(N\,HCl \times V\,HCl - N\,NaOH \times V\,NaOH) \times 16 \times 100\%}{G \times (100 - W) \times 9.94\%}$$

Wherein D.D.% is the degree of deacetylation; N HCl is the concentration of hydrochloric acid titrant (0.3 mol/L), mol/L; V HCl is the volume of hydrochloric acid titrant (0.3 mol/L), L; N NaOH is the concentration of NaOH titrant (0.15 mol/L), mol/L; V NaOH is the volume of NaOH titrant (0.15 mol/L), L; G is the weighing of the sample for test, g; W is the percentage of drying loss, %; for example, the percentage of drying loss is 20% when W is 20; 16 is the amount of amino acid equivalent to 1 mol/L hydrochloric acid, g. The sodium hydroxide solution used is 17 L and is substituted to obtain the calculation result of 95.57%, which means that the degree of deacetylation of chitosan is 95.57%.

S22. Determination of the Intrinsic Viscosity of Chitosan.

The mixed solvent used in the following of this step is composed of an acetic acid solution and sodium chloride solution in the ratio 1:1 by volume;

Wherein: the concentration of the acetic acid solution is 0.1 mol/L and the concentration of sodium chloride solution is 0.2 mol/L.

Preparing the chitosan solution to be tested: dissolving an appropriate amount of chitosan in 50 mL of the mixed solvent to prepare the chitosan solution for testing, with the concentration recorded as C1.

Fixing the Ubbelohde viscometer vertically in a constant temperature water bath (with temperature 30° C.±0.05° C.), and in the room temperature of 30° C. can be measured directly. The liquid level of the water bath is higher than the uppermost ball, determining the time of 10 mL of the chitosan solution to be measured flowing through the viscometer upper and lower scale lines (a1 to a2), recorded as T1; then accurately measuring 5 mL of mixed solvent into the viscometer to dilute the chitosan solution to be measured, to obtain dilution 1 and the concentration recorded as C2; determining the time of the dilution 1 flowing through the viscometer upper and lower scale lines (a1 to a2), recorded as T2; continuing to accurately measure 5 mL, 5 mL, 5 mL of mixed solvent and adding to the viscometer respectively to dilute the sample, to obtain the corresponding diluent, the concentration respectively recorded as C3, C4, C5, to determine the time of flowing through the upper and lower scales and recorded as T3, T4, T5; using the same method to determine the outflow time of 10 mL of mixed solvent (5 mL of 0.1 mol/L acetic acid solution+5 mL of 0.2 mol/L aqueous sodium chloride solution), recorded as T0.

Thus, it obtains C2=⅔×C1, C3=½×C1, C4=⅖×C1, C5=⅓×C1. The corresponding relative viscosities is [η], η1=T1/T0, η2=T2/T0, η3=T3/T0, η4=T4/T0, and η5=T5/T0. The specific viscosity is ηsp=η−1; the reduced viscosity is asp/C. Calculating the reduced viscosity at each time point and a straight line is made from the reduced viscosity to the concentration, and the intercept is the characteristic viscosity η.

The method of testing the characteristic viscosity of each modified chitosan of the present invention is basically the same as the method of testing the intrinsic viscosity of chitosan;

The method of testing the intrinsic viscosity of each modified chitosan provided by the invention is basically the same as the method of testing the intrinsic viscosity of the chitosan; the difference is only that the raw material to be tested is modified chitosan.

The T-values and concentrations of modified chitosan obtained by each irradiation dose treatment in embodiment 1 provided by the invention and unmodified chitosan in comparative embodiment 1 are shown in Table 1 below.

TABLE 1

Comparison of T-Values and Concentrations Obtained at Each Irradiation Dose In Embodiment 1 and Comparative Embodiment 1

| T-Value/Second | T0 | T1 | T2 | T3 | T4 | T5 | Concentration C1 |
|---|---|---|---|---|---|---|---|
| Raw Chitosan | 118.47 | 382.39 | 282.02 | 234.31 | 202.76 | 185.50 | 0.004 g/L |
| 20 KGy Irradiation Treatment | 118.47 | 184.44 | 160.25 | 148.6 | 142.05 | 137.7 | 2 g/L |
| 40 KGy Irradiation Treatment | 118.47 | 161.33 | 145.35 | 137.64 | 132.61 | 129.57 | 2 g/L |
| 60 KGy Irradiation Treatment | 118.47 | 152.17 | 139.32 | 133.45 | 130.24 | 128.22 | 2 g/L |
| 80 KGy Irradiation Treatment | 118.47 | 179.75 | 157.96 | 147.14 | 141.02 | 136.95 | 0.004 g/L |
| 100 KGy Irradiation Treatment | 118.47 | 173.21 | 154.42 | 145.08 | 139.52 | 135.86 | 0.004 g/L |

The intrinsic viscosities of chitosan obtained from each irradiation dose treatment are shown in Table 2 below.

TABLE 2

Comparison of The Intrinsic Viscosity of Chitosan Obtained by Each Irradiation Dose Treatment

| Irradiation Treatment | 0 KGy | 20 KGy | 40 KGy | 60 KGy | 80 KGy | 100 KGy |
|---|---|---|---|---|---|---|
| Intrinsic Viscosity | 380 | 237 | 127 | 115 | 111 | 110 |

By $\eta = k \times M^a$, $k = 1.63 \times 10^{-31} \times (D.D.)^{14}$, $a = -1.02 \times 10^{-2} \times (D.D.) + 1.82$, the molecular weight of chitosan at each irradiation dose was calculated as shown in Table 3.

TABLE 3

Comparison of Molecular Weight of Chitosan Obtained at Each Irradiation Dose Treatment

| Irradiation Treatment | 0 KGy | 20 KGy | 40 KGy | 60 KGy | 80 KGy | 100 KGy |
|---|---|---|---|---|---|---|
| Numerical Average Molecular Weight | 591862 | 329097 | 151527 | 133937 | 128170 | 126736 |

Figure 2:
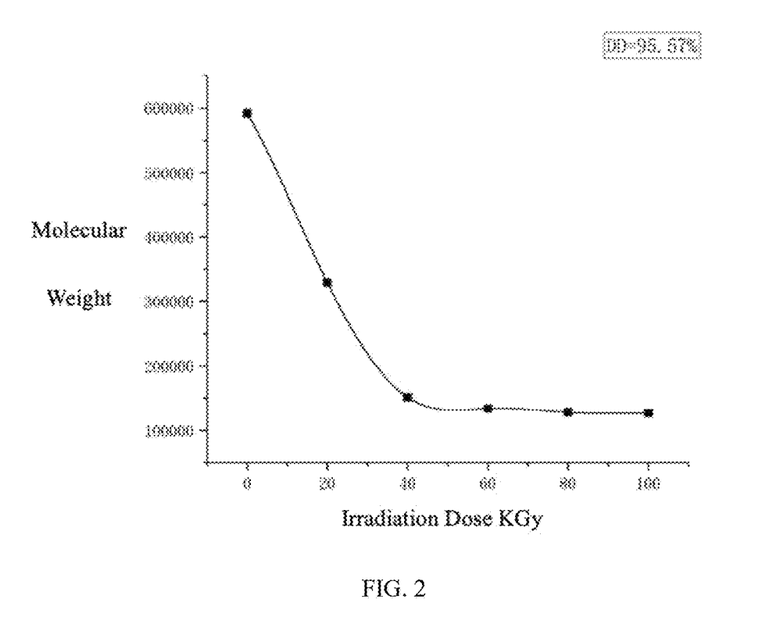
FIG. 2 is a diagram showing the relationships between irradiation dose and product molecular weight.

FIG. 2 is a diagram showing the relationships between irradiation dose and product molecular weight. Therefore, it can be seen from FIG. 2 and Table 3 that the molecular weight of chitosan basically stopped decreasing when the irradiation dose was 100 KGy. At less than 60 KGy, the molecular weight of chitosan decreases faster, and at 100 KGy, the molecular weight tends to be stable.

Since the invention uses changing the molecular weight of chitosan to improve the bacteriostatic ability, it is necessary to screen what dose of irradiation to obtain the best bacteriostatic ability of the modified chitosan.

Exploration of the Antibacterial Ability of Modified Chitosan:

1. Configuration of MH broth liquid medium: taking 21 g of MH broth solid medium, diluting and fixing into a 1000 mL volumetric flask, and sterilizing at 121° C. for 30 min by using an autoclave, then removing and dispensing into a 250 mL conical flask, for refrigerated storage for the following application.

Dissolving the chitosan degraded by 0 KGy, 20 KGy, 40 KGy, 60 KGy, 80 KGy, 100 KGy irradiation in 1% acetic acid solution by volume, and under aseptic conditions, taking 3 L of 0.5 g/mL chitosan irradiated by 0 KGy, 20 KGy, 40 KGy, 60 KGy, 80 KGy, 100 KGy and adding into a 50 mL centrifuge tube; and then adding 27 mL of the liquid medium respectively, and diluting 0.5 g/mL of chitosan to 0.05 g/mL as one group. A total of four groups of chitosan dilutions treated with different irradiation were prepared by the same operation as above. Taking one more 50 mL centrifuge tube with addition of 30 mL of liquid medium with bacteria and no chitosan as a control group.

Under the aseptic conditions, 80 μL of *Escherichia coli*, 80 μL of *Staphylococcus aureus*, 80 μL of *Shewanella putrefaciens* and 80 μL of *Salmonella typhimurium* to be tested were added to the four groups of diluted chitosan solutions, and the absorbance was measured for 0 h after shaking. The absorbance was measured every two hours in after being put into the constant temperature shaking chamber.

Determination of *Shewanella putrefaciens*: Taking 21 g of MH broth solid medium, diluting and fixing the volume into a 1000 mL volumetric flask, and adding agar when to be heated until it starts to boil; continuing to stir and heat for 5 minutes by using a glass rod, then dividing into four 250 mL conical flasks and sealing it. Preparing sterile water by dispensing 100 mL of distilled water in one conical flask and sealing it. Putting the conical flask with distilled water, solid medium and testing tubes together inside the autoclave, to sterilize at 121° C. for 30 min, then removing and dispensing into 250 mL conical flasks for refrigerated storage for following application. After sterilization, removing the solid medium and testing tubes from the autoclave, and pouring about 10 mL of solid medium into the testing tubes under sterilized environment and tilted to make an inclined plane. After the medium is solidified, dissolving the lyophilized powder of *Shewanella putrefaciens* with 0.5 mL of sterile water, and then inoculating on the 2 inclined plane already prepared, putting them into the constant temperature incubator to be incubated at 37° C. for 2 days. After 2-day incubation, observing the growth of the strain and then repeating the above method of measuring the growth cycle of *Escherichia coli* and *Staphylococcus aureus* according to the growth of the strain for the determination of the growth cycle of *Shewanella putrefaciens*.

Figure 3:
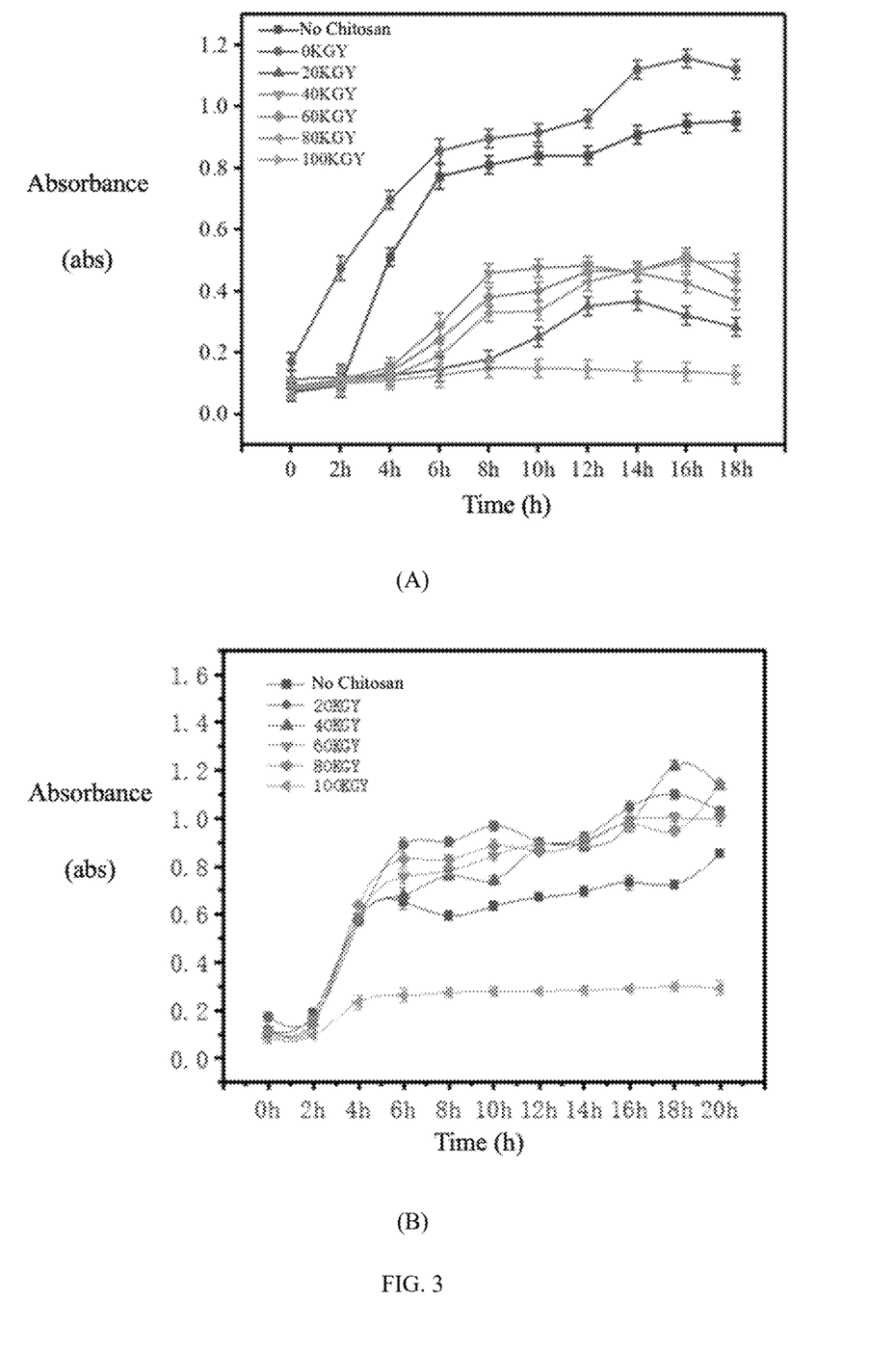
FIG. 3 is a diagram showing the growth curve of each antibacterial effect of chitosan after each irradiation, where (A), (B), (C) and (D) are *Shewanella putrefaciens, Escherichia coli, Staphylococcus aureus* and *Salmonella typhimurium* respectively.

FIG. 3 is a diagram showing the growth curve of each antibacterial effect of chitosan after each irradiation, where (A), (B), (C) and (D) are *Shewanella putrefaciens, Escherichia coli, Staphylococcus aureus* and *Salmonella typhimurium* respectively.

FIG. 3 shows that the growth curves of *Escherichia coli, Staphylococcus aureus, Shewanella putrefaciens* and *Salmonella typhimurium* were plotted in combination with the measured data, and comparing the experimental results of each group, it can be seen that the best antibacterial effect was achieved when the irradiation dose was 100 KGy in all the four inhibition effect graphs. Therefore, the best irradiation dose of chitosan in the invention is 100 KGy.

Embodiment 2

The modified chitosan used in this embodiment is the modified chitosan obtained after degradation by 100 KGy irradiation in embodiment 1, with a number average molecular weight of 126736.

This embodiment provides a preparation method for the modified chitosan-LZM-CA composite antibacterial cling film optimized by response surface methodology, comprising the following steps:

(1) Screening the Central Level of the Main Effect Factor.

S11. Weighing a certain amount of modified chitosan dissolved in acetic acid solution with a volume percentage of 1%, stirring well with a glass rod and then putting into an ultrasonic stirrer with adjustment to 100 W and heating for 15-20 min until the chitosan is completely dissolved and fixed into a 100 L volumetric flask to obtain chitosan coating solution.

S12. Taking a certain amount of carrageenan and dissolving it in the chitosan coating solution obtained in step S11, and putting into the ultrasonic stirrer with adjustment to 100 W and heating for 15-20 min until complete dissolution, to obtain the chitosan-CA mixture; weighing a certain amount of lysozyme and dissolving it in the chitosan-CA mixture; because lysozyme is easily soluble in water, it can be dissolved by slightly stirring with a glass rod; to obtain the composite film coating solution.

S13. After standing to dissolve the air bubbles on the surface of the composite film coating solution, 12 mL of composite film coating solution was extracted with a syringe and evenly applied to a sterilized plastic petri dish with a diameter of 90 mm, and then dried in an oven at 45° C. for 8 h to obtain a modified chitosan-LZM-CA composite antibacterial cling film.

Single-factor experimental design: to obtain the best composite film coating solution for the freshness of crayfish, the effect of different concentration ratios of the three components added to the composite film coating solution on the TVB-N value of crayfish during refrigeration can be investigated, to change the addition amount of one of the components and fix the addition amount of the remaining two components. For instance, the amount of modified chitosan and carrageenan were fixed at 10 g/L and 1 g/L respectively, and the effect of the composite film on crayfish TVB-N values was investigated when the addition of lysozyme was 0.5 g/L, 1 g/L, 1.5 g/L, 2 g/L, and 2.5 g/L, respectively, to select an optimal concentration of LZM. Similarly, when exploring the amount of modified chitosan addition, to fix CA and LZM additions of 2 g/L and 1.5 g/L; when exploring the amount of CA addition, to fix modified chitosan and LZM additions of 14 g/L and 1.5 g/L. The single-factor experimental design is shown in Table 4.

TABLE 4

Single-Factor Experimental Design

| Factors | Level | | | | |
|---|---|---|---|---|---|
| | 1 | 2 | 3 | 4 | 5 |
| Modified Chitosan g/L | 10 | 12 | 14 | 16 | 18 |
| Lysozyme g/L | 0.5 | 1 | 1.5 | 2 | 2.5 |
| Carrageenan g/L | 1 | 1.5 | 2 | 2.5 | 3 |

The processing method for crayfish: the fresh freshwater crayfish bought with tap water to clean for 3-4 times, with peeling off the head of shrimp and removing the intestinal threads and then cleaning and draining the tail of shrimp; putting into the steamer to be steamed at 100° C. for 7 min and then cooled, drained and wrapped with different ratios of composite film into bags for vacuum packaging. Periodically selected samples were tested for the corresponding indicators.

TVB-N value determination: Referring to the national standard GB5009.228-2016, the freshwater crayfish TVB-N value was determined using the automatic Kjeldahl method. The samples were mashed and homogenized with 30 mL of distilled water, to be put into a centrifuge with adjustment of 7500 r/min and 4°, removing the supernatant with 1 g MgO injected into a distillation tube to be distilled after 20-min centrifugation. The ratio of methyl red ethanol solution and bromocresol green ethanol solution was 1:5, with the addition of boric acid solution when being used. The standard solution was titrated with sulfuric acid standard solution (0.1 mol/L). The addition of boric acid receiving solution was 30 L and the distillation time was 3 min.

The content of TVB-N in the sample is calculated by the formula: $X=[(V1-V2) \times C \times 14] \times 100/M$.

Wherein V1: the volume of sulfuric acid standard titration solution consumed by the specimen, with units of L V2: the volume of sulfuric acid standard solution consumed by the reagent blank, with units of L 14: the equivalent nitrogen content of titration of 1.0 mol of sulfuric acid solution, with units of grams per mole.

C: the concentration of the standard solution of sulfuric acid, with units of L

M: the mass of the specimen, with units of g.

100: the conversion factor for converting the calculated results into milligrams per hundred grams.

Figure 4:
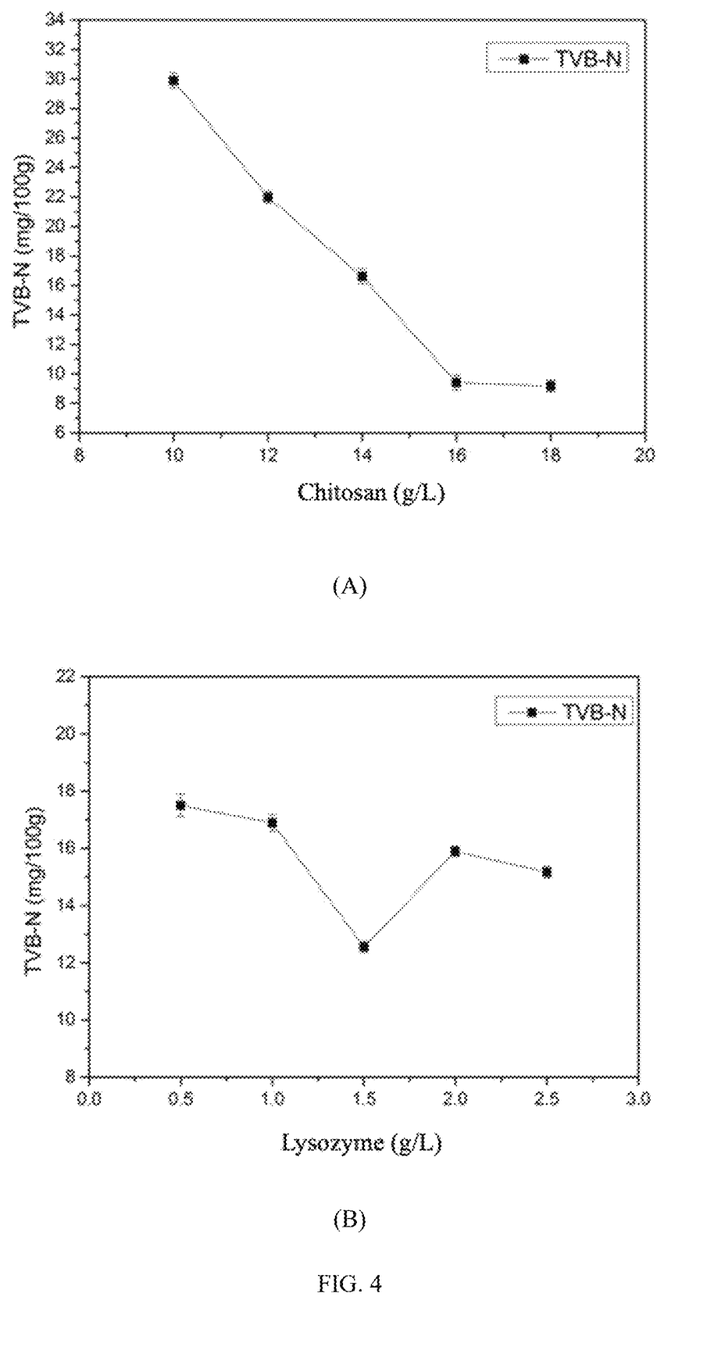
FIG. 4 is a diagram showing the effect of modified chitosan-LZM-CA composite antibacterial film on TVB-N values of crayfish during refrigeration obtained from single-factor experiments with different group ratios: where (A) shows the effect of the concentration of modified chitosan in the composite film coating solution on TVB-N value; (B) shows the effect of the concentration of lysozyme in the composite film coating solution on the TVB-N value; (C) shows the effect of the concentration of carrageenan in the composite film coating solution on the TVB-N value.

The effects of composite films with different component additions on the TVB-N values of crayfish are shown in FIG. 4. FIG. 4 is a diagram showing the effect of modified chitosan-LZM-CA composite antibacterial film on TVB-N values of crayfish during refrigeration obtained from single-factor experiments with different group ratios: where (A) shows the effect of the concentration of modified chitosan in the composite film coating solution on TVB-N value; (B) shows the effect of the concentration of lysozyme in the composite film coating solution on the TVB-N value; (C) shows the effect of the concentration of carrageenan in the composite film coating solution on the TVB-N value. It can be concluded that the optimal addition amount of modified chitosan is 16 g/L, the optimal addition amount of carrageenan is 2 g/L, and the optimal addition amount of lysozyme is 1.5 g/L.

The effect of different modified chitosan additions is that the TVB-N value is already low at the concentration of 16 g/L, and the change in value after increasing the concentration was not significant and the difference was not significant after increasing the concentration; considering the solubility of modified chitosan, the best addition of modified chitosan is 16 g/L. The response surface experimental design of modified chitosan additions should be 14 g/L. The effect of different carrageenan additions was that the TVB-N value was lower at a concentration of 2 g/L, and still decreased and the difference was not significant after increasing the concentration; considering the above results that the effect of CA additions on the change of TVB-N value during crayfish refrigeration and the principle of using a small amount of preservative, 2 g/L should be selected, and the CA addition amount should be further optimized using the response surface methodology in the range of 1.5 g/L-2.5 g/L. The effect of different lysozyme additions was the lowest TVB-N value at a concentration of 1.5 g/L, and still decreased and the difference was not significant after increasing the concentration; considering the above results that the effect of LZM additions on the changes in TVB-N values during crayfish refrigeration and the principle of using a small amount of preservative, 1.5 g/L should be selected, and the LZM addition amount should be further optimized using the response surface methodology in the range of 1 g/L-2 g/L.

(2) Response surface optimization: according to the experimental design principle of Box-Behnken central group, and according to the single-factor experiment results in step (1), three better levels of the three factors including the concentration of modified chitosan, the concentration of lysozyme and the concentration of carrageenan in the composite film coating solution, were selected as the influencing factors, and the TVB-N value of crayfish during refrigeration as the measurement index, and the experimental design was carried out by response surface analysis with the 3 factors and 3 levels on the basis of single-factor experiment.

The specific experimental method is as follows: according to the results of the single-factor experiment, the concentration levels of modified chitosan ranging from 14 g/L to 18 g/L, the concentration levels of lysozyme ranging from 1 g/L to 2 g/L, and the concentration levels of carrageenan ranging from 1.5 g/L to 2.5 g/L were used as the investigating factors, and the total volatile basic nitrogen content of crayfish during refrigeration was used as the response value, and the following Table 5 and Table 6 were designed as the table of factors and levels of response surface experiment and the table of scheme and results of response surface experiment to determine the optimal ratio based on the experimental results.

TABLE 5

Factors and Levels of Response Surface Experiment

| Factors | Level −1 | Level 0 | Level 1 |
|---|---|---|---|
| Modified Chitosan g/L | 14 | 16 | 18 |
| Lysozyme g/L | 1 | 1.5 | 2 |
| Carrageenan g/L | 1.5 | 2.0 | 2.5 |

TABLE 6

Scheme and Results of Response Surface Experiment

| Experiment No. | Modified Chitosan | Carrageenan | Lysozyme | TVB-N Value |
|---|---|---|---|---|
| 1 | 14 g/L | 2 g/L | 2 g/L | 25.45 |
| 2 | 14 g/L | 1.5 g/L | 1.5 g/L | 31.59 |
| 3 | 14 g/L | 2.5 g/L | 1.5 g/L | 27.86 |
| 4 | 14 g/L | 2 g/L | 1 g/L | 25.42 |
| 5 | 16 g/L | 2.5 g/L | 1 g/L | 25.32 |
| 6 | 16 g/L | 2 g/L | 1.5 g/L | 25.57 |
| 7 | 16 g/L | 2 g/L | 1.5 g/L | 24.58 |
| 8 | 16 g/L | 2 g/L | 1.5 g/L | 23.05 |
| 9 | 16 g/L | 1.5 g/L | 1 g/L | 28.44 |
| 10 | 16 g/L | 1.5 g/L | 2 g/L | 25.02 |
| 11 | 16 g/L | 2.5 g/L | 2 g/L | 30.82 |
| 12 | 18 g/L | 1.5 g/L | 1.5 g/L | 32.64 |
| 13 | 18 g/L | 2 g/L | 1 g/L | 28.16 |
| 14 | 18 g/L | 2 g/L | 2 g/L | 26.76 |
| 15 | 18 g/L | 2.5 g/L | 1.5 g/L | 30.24 |

(3) Performing variance analysis and linear fitting of the experimental results obtained from step (2) using the software Design-Expert to obtain variance analysis results and second-order polynomial regression models, to analyze the interactions among the factors and the relationships between the factors and the response values.

The second order polynomial regression model equation in step (3) is as follows:

$$Y=272.74-193.1*A-635.19*B-351.85*C+24.55*A*B-6.91*A*C+313.22*B*C+57.28*A^2+1373.08*B^2+1013.25*C^2;$$

wherein A is the concentration of modified chitosan, B is the concentration of carrageenan, and C is the concentration of lysozyme.

(4) Performing significance analysis on the second-order polynomial regression model to determine whether the regression equation is appropriate based on the p-value with lack of fit of the regression equation to test whether the lack of fit is significant; to determine whether the regression equation is significant based on the significance testing, and determine the predictive value of the model based on the simulated determination coefficient R2, the modified determination coefficient $R^2_{Adj}$ of the model and the predictive determination coefficient $R^2_{Pred}$ of the model.

Analysis of response surface experimental results: The design and results of the response surface experiments are shown in Table 6, and the central experiment was repeated three times with a total of 15 experimental points. The software Design-Expert was used to perform analysis of variance and linear fitting of the table, and the analysis of variance results and second-order polynomial regression model were obtained. It can be seen that the model F=18.97, p<0.0, indicating significant; and the lack of fit term p=0.6826>0.05, indicating insignificant; the simulated coefficient of determination R2 is 0.9606 and the correction coefficient R2Adj=0.9100, indicating that this model can explain 91.00% of the variation in response values and the equation fits well. Therefore, the model is reliable, and the resulting equation can be used to determine the optimal ratio of each component in this composite film coating solution.

Table 7 shows the analysis of variance for the response surface regression equation.

TABLE 7

Analysis of Variance for Response Surface Regression Equation

| Source | Sum of Squares | Degrees of freedom | Mean Square | F-value | p | Significance |
|---|---|---|---|---|---|---|
| Model | 235.74 | 9 | 26.19 | 18.97 | 0.0004 | Significant |
| A-Modified Chitosan 1 | 12.10 | 1 | 12.10 | 8.77 | 0.0211 | |
| B-CA | 4.26 | 1 | 4.61 | 3.34 | 0.1105 | |
| C-LZM | 1.26 | 1 | 1.26 | 0.9099 | 0.3719 | |
| AB | 8.27 | 1 | 8.27 | 5.99 | 0.0433 | |
| AC | 3.86 | 1 | 3.86 | 2.80 | 0.1384 | |
| BC | 64.00 | 1 | 64.00 | 46.36 | 0.0003 | |
| $A^2$ | 42.74 | 1 | 42.74 | 30.96 | 0.0008 | |
| $B^2$ | 84.45 | 1 | 84.45 | 61.17 | 0.0001 | |

TABLE 7-continued

Analysis of Variance for Response Surface Regression Equation

| Source | Sum of Squares | Degrees of freedom | Mean Square | F-value | p | Significance |
|---|---|---|---|---|---|---|
| $C^2$ | 3.63 | 1 | 3.63 | 2.63 | 0.1489 | |
| Residuals | 9.66 | 7 | 1.38 | | | |
| Lack of Fit | 2.77 | 3 | 0.9228 | 0.5353 | 0.6826 | Not Significant |
| Pure Error | 6.90 | 4 | 1.72 | | | |
| Total | 245.42 | 16 | | | | |

(5) Using the software Design-Expert to plot and analyze the relationship between the independent variables and response values based on the second-order polynomial regression model, to obtain the three-dimensional response surface plot of the regression equation; to analyze and optimize the second-order polynomial model and response surface through the Design-Expert software to determine the optimal concentration of each component in the composite film coating solution.

The slope size of the response surface reflects the degree of influence of factors on the change of response value, while the contour profile is related to the strength of interaction between factors, the more distorted indicates the stronger interaction of two factors, on the contrary, the closer to circular indicates the weaker interaction.

Figure 5:
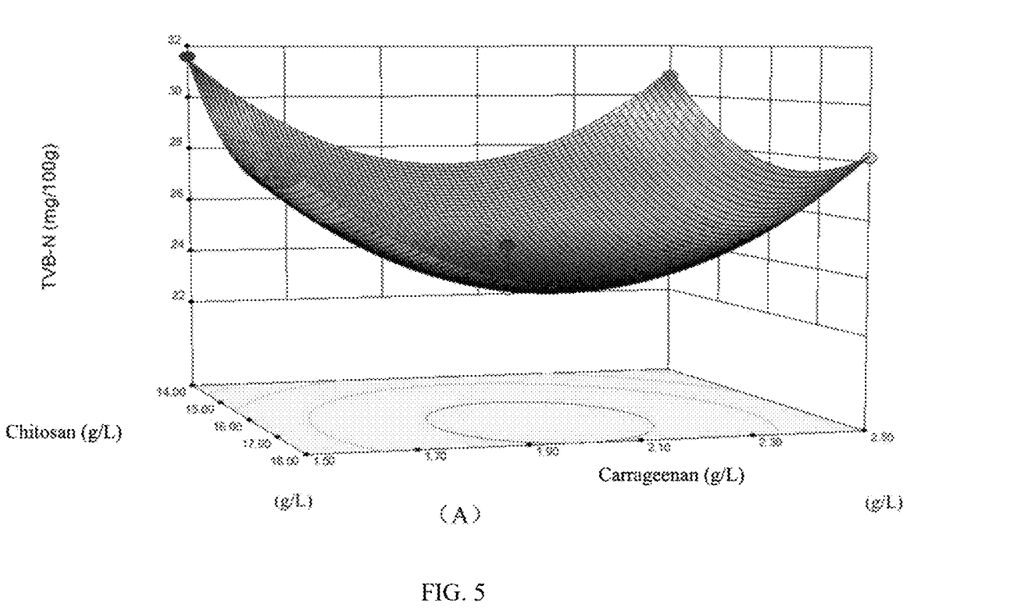
In FIG. 5, (A) is the diagram showing the three-dimensional response surface plots of the effects of concentration of modified chitosan, concentration of carrageenan and TVB-N values in response surface experiments; (B) is the diagram showing the three-dimensional response surface plot of the effects of concentration of modified chitosan, concentration of lysozyme and TVB-N value; and (C) is the diagram showing the three-dimensional response surface plot of the effect of lysozyme concentration, carrageenan concentration and TVB-N value.

In FIG. 5, (A) is the diagram showing the three-dimensional response surface plots of the effects of concentration of modified chitosan, concentration of carrageenan and TVB-N values in response surface experiments; (B) is the diagram showing the three-dimensional response surface plot of the effects of concentration of modified chitosan, concentration of lysozyme and TVB-N value; and (C) is the diagram showing the three-dimensional response surface plot of the effect of lysozyme concentration, carrageenan concentration and TVB-N value. In the FIG. (A), it shows that as the concentration of modified chitosan and carrageenan increased, the response surface sloped to a decreasing trend followed by an increasing trend, and the contour line was close to an ellipse, indicating that the interaction between chitosan and carrageenan was weak. In the FIG. (B), it shows that the increase of TVB-N value can be suppressed with the increase of modified chitosan and lysozyme concentration, but it increases after reaching a certain level by continuing to increase the addition amount. The contours are close to elliptical, indicating an interactive effect. In the FIG. (C), it shows that increasing the addition of lysozyme and carrageenan, the TVB-N values reached a minimum and then increased, and the contour of the contour was irregularly shaped, indicating that lysozyme and carrageenan interacted to affect the TVB-N values.

In summary, the second-order polynomial model and response surface were analyzed and optimized by Design-Expert software, and the optimal addition amounts of each component of the modified chitosan-LZM-CA composite film were determined as 16 g/L for chitosan, 1.5 g/L for LZM, and 2 g/L for CA. The TVB-N values of crayfish wrapped with modified chitosan-LZM-CA composite antibacterial film were determined repeatedly under these conditions.

Embodiment 3

The embodiment discloses a modified chitosan-LZM-CA composite antibacterial cling film, wherein the cling film is obtained by uniformly coating the composite film coating solution on the surface of the clean base material and being dried at a constant temperature; wherein the composite film coating solution is composed of modified chitosan, carrageenan, lysozyme and solvent; each L of composite film coating solution contains 16 g of modified chitosan, 2 g of carrageenan, and 1.5 g of lysozyme; and the solvent is the acetic acid solution with a volume percentage of 1%.

The modified chitosan-LZM-CA composite antibacterial cling film described in this embodiment was prepared by the following method comprising the following steps:

S11. Weighing 1.6 g of modified chitosan obtained by 100 KGy irradiation treatment of embodiment 1 to be dissolved in acetic acid solution with a volume percentage of 1%, stirring well with a glass rod and then putting into an ultrasonic stirrer with adjustment to 100 W and heating for 15-20 min until the chitosan is completely dissolved and fixed into a 100 L volumetric flask to obtain chitosan coating solution.

S12. Taking 0.2 g of carrageenan and dissolving it in the chitosan coating solution obtained in step S11, and putting into the ultrasonic stirrer with adjustment to 100 W and heating for 15-20 min until complete dissolution, to obtain the chitosan-CA mixture; weighing 0.15 g of lysozyme and dissolving it in the chitosan-CA mixture; because lysozyme is easily soluble in water, it can be dissolved by slightly stirring with a glass rod; to obtain the composite film coating solution.

S13. After standing to dissolve the air bubbles on the surface of the composite film coating solution, 12 mL of composite film coating solution was extracted with a syringe and evenly applied to a sterilized plastic petri dish with a diameter of 90 mm, and then dried in an oven at 45° C. for 8 h to obtain a modified chitosan-LZM-CA composite antibacterial cling film.

Comparative Embodiment 2

The comparative embodiment discloses a modified chitosan composite antibacterial cling film, wherein the cling film is obtained by uniformly coating the composite film coating solution on the surface of the clean base material and being dried at a constant temperature; wherein the composite film coating solution is composed of modified chitosan and solvent; each L of composite film coating solution contains 16 g of modified chitosan; and the solvent is the acetic acid solution with a volume percentage of 1%.

The modified chitosan composite antibacterial cling film described in this comparative embodiment was prepared by the following method comprising the following steps:

Weighing 1.6 g of modified chitosan obtained by 100 KGy irradiation treatment of embodiment 1 to be dissolved in acetic acid solution with a volume percentage of 1%, stirring well with a glass rod and then putting into an ultrasonic stirrer with adjustment to 100 W and heating for 15-20 min until the chitosan is completely dissolved and fixed into a 100 L volumetric flask to obtain chitosan coating solution. After standing to dissolve the air bubbles on the surface of the composite film coating solution, 12 mL of composite film coating solution was extracted with a syringe and evenly applied to a sterilized plastic petri dish with a diameter of 90 mm, and then dried in an oven at 45° C. for 8 h to obtain a modified chitosan composite antibacterial cling film.

Comparative Embodiment 3

The comparative embodiment discloses a modified chitosan-CA composite antibacterial cling film, wherein the cling film is obtained by uniformly coating the composite film coating solution on the surface of the clean base material and being dried at a constant temperature; wherein the composite film coating solution is composed of modified chitosan, carrageenan and solvent; each L of composite film coating solution contains 16 g of modified chitosan, 2 g of carrageenan; and the solvent is the acetic acid solution with a volume percentage of 1%.

The modified chitosan-LZM-CA composite antibacterial cling film described in this comparative embodiment was prepared by the following method comprising the following steps:

S11. Weighing 16 g of modified chitosan obtained by 100 KGy irradiation treatment of embodiment 1 to be dissolved in acetic acid solution with a volume percentage of 1%, stirring well with a glass rod and then putting into an ultrasonic stirrer with adjustment to 100 W and heating for 15-20 min until the chitosan is completely dissolved and fixed into a 100 L volumetric flask to obtain chitosan coating solution.

S12. Taking 2 g of carrageenan and dissolving it in the chitosan coating solution obtained in step S11, and putting into the ultrasonic stirrer with adjustment to 100 W and heating for 15-20 min until complete dissolution, to obtain the composite film coating solution.

S13. After standing to dissolve the air bubbles on the surface of the composite film coating solution, 12 mL of composite film coating solution was extracted with a syringe and evenly applied to a sterilized plastic petri dish with a diameter of 90 mm, and then dried in an oven at 45° C. for 8 h to obtain a modified chitosan-CA composite antibacterial cling film.

Comparative Embodiment 4

The comparative embodiment discloses a modified chitosan-LZM composite antibacterial cling film, wherein the cling film is obtained by uniformly coating the composite film coating solution on the surface of the clean base material and being dried at a constant temperature; wherein the composite film coating solution is composed of modified chitosan, lysozyme and solvent; each L of composite film coating solution contains 16 g of modified chitosan and 1.5 g of lysozyme; and the solvent is the acetic acid solution with a volume percentage of 1%.

The modified chitosan-LZM composite antibacterial cling film described in this embodiment was prepared by the following method comprising the following steps:

S11. Weighing 16 g of modified chitosan obtained by 100 KGy irradiation treatment of embodiment 1 to be dissolved in acetic acid solution with a volume percentage of 1%, stirring well with a glass rod and then putting into an ultrasonic stirrer with adjustment to 100 W and heating for 15-20 min until the chitosan is completely dissolved and fixed into a 100 L volumetric flask to obtain chitosan coating solution.

S12. Weighing 1.5 g of lysozyme and dissolving it in the chitosan coating solution; because lysozyme is easily soluble in water, it can be dissolved by slightly stirring with a glass rod; to obtain the composite film coating solution.

S13. After standing to dissolve the air bubbles on the surface of the composite film coating solution, 12 mL of composite film coating solution was extracted with a syringe and evenly applied to a sterilized plastic petri dish with a diameter of 90 mm, and then dried in an oven at 45° C. for 8 h to obtain a modified chitosan-LZM composite antibacterial cling film.

The invention tested the surface morphology, phase analysis and mechanical properties of the modified chitosan-LZM-CA composite antibacterial cling film prepared in embodiment 3, the modified chitosan film, the modified chitosan-CA composite film and the modified chitosan-LZM in the comparative embodiment 2-4 respectively, and the specific test methods and test results are as follows.

Figure 1:
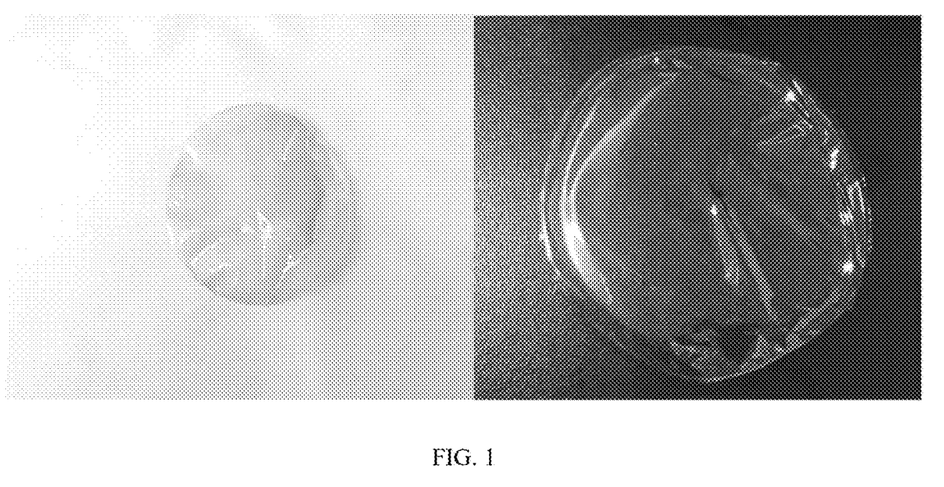
FIG. 1 is a diagram showing the comparison of the finished modified chitosan-LZM-CA composite antibacterial cling film prepared in embodiment 3 and the finished modified chitosan film prepared in comparative embodiment 2, in order from left to right.

FIG. 1 is a diagram showing the comparison of the finished modified chitosan-LZM-CA composite antibacterial cling film prepared in embodiment 3 and the finished modified chitosan film prepared in comparative embodiment 2, in order from left to right. As can be seen from FIG. 1, the transparency of the composite film and the pure modified chitosan film prepared by the invention is poor. However, the mechanical strength was greater (referring to the Table 8). The finished products of composite film prepared by the invention is better.

TABLE 8

Comparison of Tensile Strength and Elongation at Break of The Film Prepared in Embodiment 3 and Comparative Embodiment 2-4 Respectively

|  | Tensile Strength MPa | Elongation at Break |
|---|---|---|
| Modified Chitosan Film | 16.01 | 12.29 |
| Modified Chitosan-CA Composite Film | 25.3 | 8.92 |
| Modified Chitosan-LZM Composite Film | 12.31 | 11.57 |
| Modified Chitosan-LZM-CA Composite Antibacterial Cling Film | 21.13 | 10.03 |

Table 8 shows the results of the physical properties tests of the films made in embodiment 3 and comparative embodiment 2-4 respectively. The results in Table 8 show that the tensile strength was significantly improved after the addition of carrageenan. The tensile strength of the modified chitosan-LZM-CA composite antibacterial cling film prepared in embodiment 3 was 21.12 MPa.

Figure 6:
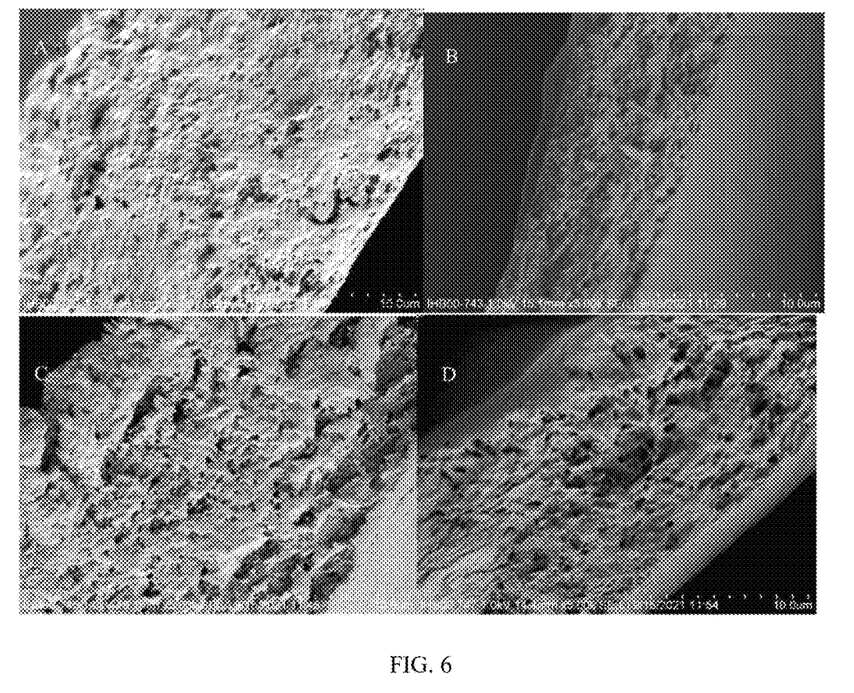
In FIG. 6, A is the diagram showing the modified chitosan film prepared in comparative embodiment 2 by the scanning electron microscope; B is the diagram showing the modified chitosan-CA composite film prepared in comparative embodiment 3 by the scanning electron microscope; C is the diagram showing the modified chitosan-LZM composite film prepared in comparative embodiment 4 by the scanning electron microscope; D is the diagram showing the modified chitosan-LZM-CA composite antibacterial cling film prepared in embodiment 3 by the scanning electron microscope.

In FIG. 6, A is the diagram showing the modified chitosan film prepared in comparative embodiment 2 by the scanning electron microscope; B is the diagram showing the modified chitosan-CA composite film prepared in comparative embodiment 3 by the scanning electron microscope; C is the diagram showing the modified chitosan-LZM composite film prepared in comparative embodiment 4 by the scanning electron microscope; D is the diagram showing the modified chitosan-LZM-CA composite antibacterial cling film prepared in embodiment 3 by the scanning electron microscope.

From these scanned electron microscope results (cross-sections), it can be seen that the cross-sections of pure modified chitosan are smoother, which is similar to the composite film with the addition of lysozyme. However, when carrageenan was added to the chitosan there emerge more flocculation in the cross section, indicating that the addition of carrageenan resulted in better mechanical properties of the cling film, such as increased tensile strength and enhanced mechanical properties.

Figure 7:
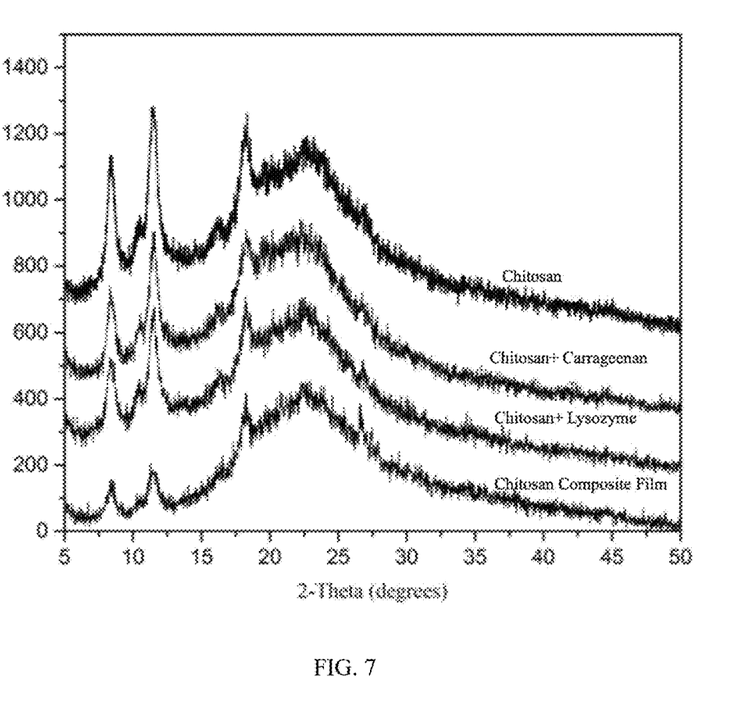
FIG. 7 is the diagram showing the XRD testing results of modified chitosan-LZM-CA composite antibacterial cling film prepared in embodiment 3, modified chitosan film, modified chitosan-CA composite film and modified chitosan-LZM composite film prepared in comparative embodiment 2-4, respectively.

FIG. 7 is the diagram showing the XRD testing results of modified chitosan-LZM-CA composite antibacterial cling film prepared in embodiment 3, modified chitosan film, modified chitosan-CA composite film and modified chitosan-LZM composite film prepared in comparative embodiment 2-4, respectively. From the graph of XRD results, it can be seen that the addition of chitosan as a substrate did not affect the basic composition of chitosan, but only led to a decrease in its peak width and peak area, which indicates that that the addition of carrageenan and lysozyme affected the crystallinity of chitosan, but no new peaks appeared which may be due to the poor crystallinity of the latter two.

The invention claimed is:

1. A chitosan-lysozyme-carrageenan composite antibacterial cling film, wherein the cling film is obtained by uniformly coating a composite film coating solution on a surface of a clean base material and drying at a constant temperature; wherein the composite film coating solution is composed of chitosan, carrageenan, lysozyme and solvent;
   each liter of composite film coating solution contains 16 grams of the chitosan, 2 grams of carrageenan and 1.5 grams of lysozyme.

2. The chitosan-lysozyme-carrageenan composite antibacterial cling film according to claim 1, wherein the constant temperature is 40-45° C. and drying time is 8h.

3. The chitosan-lysozyme-carrageenan composite antibacterial cling film according to claim 1, wherein the chitosan is produced by the following method: degrading chitosan by irradiation with a dose of 20-100 kilograys to obtain the chitosan.

4. The chitosan-lysozyme-carrageenan composite antibacterial cling film according to claim 3, wherein the irradiation dose is 80 kilograys or 100 kilograys.

* * * * *